US008587877B2

(12) United States Patent
Adachi et al.

(10) Patent No.: US 8,587,877 B2
(45) Date of Patent: Nov. 19, 2013

(54) IMAGING OPTICAL SYSTEM, INTERCHANGEABLE LENS APPARATUS AND CAMERA SYSTEM

(75) Inventors: Nobuyuki Adachi, Tokyo (JP); Takuya Imaoka, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/391,289

(22) PCT Filed: Dec. 22, 2010

(86) PCT No.: PCT/JP2010/007423
§ 371 (c)(1),
(2), (4) Date: Feb. 19, 2012

(87) PCT Pub. No.: WO2011/077716
PCT Pub. Date: Jun. 30, 2011

(65) Prior Publication Data
US 2012/0147254 A1 Jun. 14, 2012

(30) Foreign Application Priority Data
Dec. 25, 2009 (JP) .................. 2009-294157

(51) Int. Cl.
*G02B 15/14* (2006.01)
*G02B 9/00* (2006.01)
*G03B 13/00* (2006.01)

(52) U.S. Cl.
USPC ............ 359/683; 359/691; 359/740; 348/345

(58) Field of Classification Search
USPC .................. 359/740, 683, 691, 793; 348/345
See application file for complete search history.

(56) References Cited

FOREIGN PATENT DOCUMENTS

| JP | H05-273459 A | 10/1993 |
|---|---|---|
| JP | H07-261082 A | 10/1995 |
| JP | H09-171139 A | 6/1997 |
| JP | 2004-093593 A | 3/2004 |
| JP | 2004-126522 A | 4/2004 |
| JP | 2004-177435 A | 6/2004 |
| JP | 2005-316398 A | 11/2005 |
| JP | 2007-094176 A | 4/2007 |
| JP | 2007-094371 A | 4/2007 |
| JP | 2008-003108 A | 1/2008 |

*Primary Examiner* — Jack Dinh
(74) *Attorney, Agent, or Firm* — Judge Patent Associates

(57) ABSTRACT

A compact imaging optical system having a light-weight focusing lens is provided. The imaging optical system includes, in order from an object side to an image side, a front unit in which a negative lens element is arranged closest to the object side, an aperture diaphragm, and a rear unit having positive optical power. In focusing from an infinite distance object to a short distance object, the negative lens element arranged closest to the object side and the aperture diaphragm are fixed with respect to an image surface, and a part of lens elements included in the front unit or the rear unit moves along an optical axis. The imaging optical system satisfies the following condition (1): 0.9<R/f<2.0 (R: an average between an image side curvature radius of the negative lens element arranged closest to the object side, and an image side curvature radius of a second negative lens element from the object side among all the negative lens elements; f: a focal length of the entire system).

8 Claims, 11 Drawing Sheets

IMAGING OPTICAL SYSTEM, INTERCHANGEABLE LENS APPARATUS AND CAMERA SYSTEM

TECHNICAL FIELD

The present invention relates to an imaging optical system suitable for a so-called interchangeable-lens type digital camera system. Further, the present invention relates to an interchangeable lens apparatus and a camera system, each employing the imaging optical system.

BACKGROUND ART

In recent years, the market of interchangeable-lens type camera systems (also referred to simply as "camera systems", hereinafter) have been spreading rapidly. Such an interchangeable-lens type camera system includes: a camera body having an image sensor such as a CCD (Charge Coupled Device) or a CMOS (Complementary Metal-Oxide Semiconductor); and an interchangeable lens apparatus having an imaging optical system for forming an optical image on a light receiving surface of the image sensor. The interchangeable lens apparatus is attachable to and detachable from the camera body. Such a camera system is used for shooting not only still pictures but also moving pictures, and therefore, an interchangeable lens apparatus suitable for shooting of moving pictures as well as still pictures is popular.

Previously known focusing methods for the imaging optical systems include: a method in which the entirety of component lens elements are moved out; and a so-called floating method in which a front unit and a rear unit are independently moved.

Patent Literatures 1 and 2 each disclose a configuration in which a front unit and a rear unit are moved toward an object in focusing. Patent Literature 3 discloses a configuration in which, in focusing, a first lens element is fixed, and second and subsequent lens elements are moved. Patent Literature 4 discloses a configuration in which, in focusing, the entire optical system is moved out toward an object.

When shooting a moving picture by using an imaging optical system suitable for an interchangeable lens apparatus, it is necessary to perform auto-focusing continuously at a high speed. In order to perform auto-focusing continuously at a high speed, a method of repeating a series of operations as follows is known: oscillating a focusing lens unit in an optical axis direction at a high speed (referred to as "wobbling", hereinafter); detecting, from an output signal of an image sensor, signal components in a predetermined frequency band within a part of an image region; obtaining an optimal position of the focusing lens unit, at which the focusing lens unit is in its in-focus state; and moving the focusing lens unit to the optimum position. When this auto-focusing method is adopted, the outer diameters of lens elements constituting the focusing lens unit must be minimized to minimize the weight of the lens elements, in view of portability and power consumption.

CITATION LIST

Patent Literature

[PTL 1] Japanese Laid-Open Patent Publication No. 2004-126522
[PTL 2] Japanese Laid-Open Patent Publication No. 5-273459
[PTL 3] Japanese Laid-Open Patent Publication No. 2007-94371
[PTL 4] Japanese Laid-Open Patent Publication No. 2008-3108

SUMMARY OF THE INVENTION

Problems to be Solved by the Invention

In the optical systems disclosed in Patent Literatures 1 to 4, however, the number of lens elements constituting the focusing lens unit is great, which makes it difficult to move the lens elements continuously at a high speed.

Therefore, an object of the present invention is to provide: a compact imaging optical system which realizes high-speed auto-focusing, and has excellent imaging characteristics; an interchangeable lens apparatus including the imaging optical system; and a camera system including the interchangeable lens apparatus.

Solution to the Problems

An imaging optical system according to the present invention includes, in order from an object side to an image side, a front unit in which a negative lens element is arranged closest to the object side, an aperture diaphragm, and a rear unit having positive optical power. In focusing from an infinite distance object to a short distance object, the negative lens element arranged closest to the object side and the aperture diaphragm are fixed with respect to an image surface, and a part of lens elements included in the front unit or the rear unit moves along an optical axis. The imaging optical system according to the present invention satisfies the following condition (1):

$$0.9 < R/f < 2.0 \tag{1}$$

where

R is an average between an image side curvature radius of the negative lens element arranged closest to the object side, and an image side curvature radius of a second negative lens element from the object side among all the negative lens elements, and f is a focal length of the entire system.

An interchangeable lens apparatus according to the present invention includes: the above-described imaging optical system; and a lens mount section which is connectable to a camera body including an image sensor for receiving an optical image formed by the imaging optical system and converting the optical image into an electric image signal.

A camera system according to the present invention includes: an interchangeable lens apparatus including the above-described imaging optical system; and a camera body which is detachably connected to the interchangeable lens apparatus via a camera mount section, and includes an image sensor for receiving an optical image formed by the imaging optical system and converting the optical image into an electric image signal.

Effects of the Invention

According to the present invention, it is possible to realize a compact imaging optical system which is capable of performing high-speed auto-focusing adaptable to video shooting, and has excellent imaging characteristics; and an interchangeable lens apparatus and a camera system, each having the imaging optical system.

DESCRIPTION OF EMBODIMENTS

Embodiments 1 to 5

FIGS. 1, 4, 7, 10, and 13 are lens arrangement diagrams of imaging optical systems according to Embodiments 1, 2, 3, 4, and 5, respectively. Each Fig. shows an imaging optical system in an infinity in-focus condition. An arrow imparted to a lens element indicates a moving direction of the lens element during focusing from an infinity in-focus condition to a close-object in-focus condition. In each Fig., a sign (+) or (−) imparted to the symbol of each lens unit indicates the optical power of the lens unit. Further, in each Fig., a straight line located on the most right-hand side indicates the position of an image surface S.

Each of the imaging optical systems according to the respective embodiments comprises, in order from the object side to the image side, a front unit G1 having negative optical power, a diaphragm A, and a rear unit G2 having positive optical power. The following will describe the detailed configurations of the imaging optical systems according to the respective embodiments.

Embodiment 1

Figure 1:
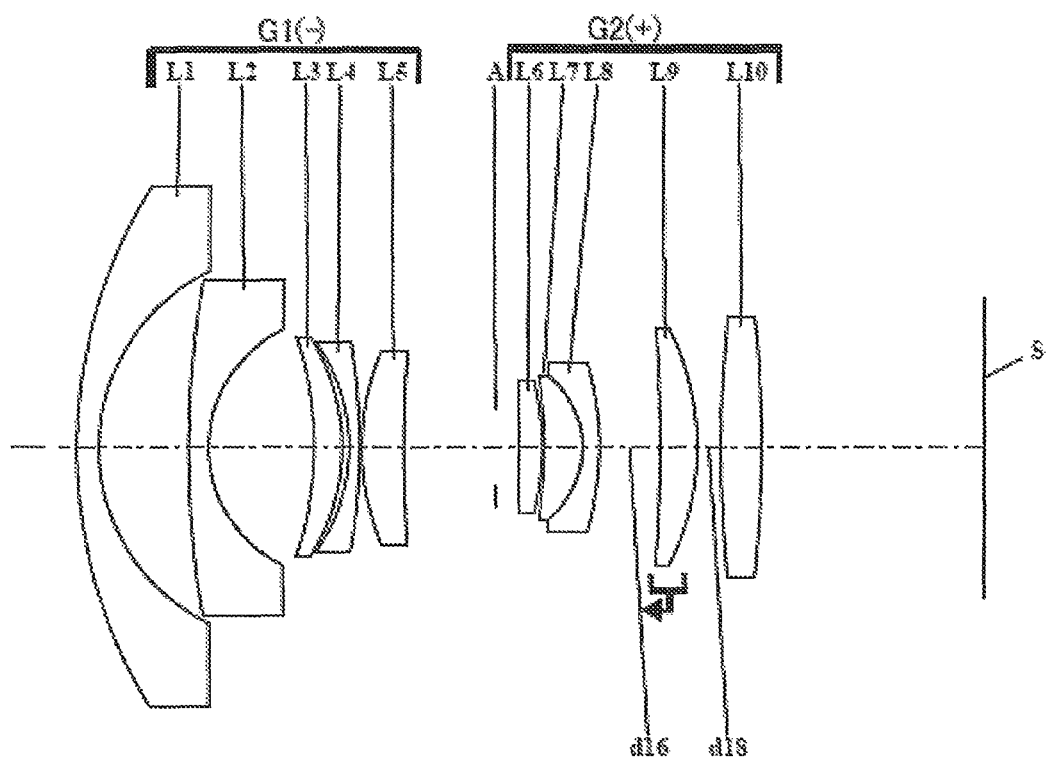
FIG. 1 is a lens arrangement diagram of an imaging optical system according to Embodiment 1.
Figure 2:
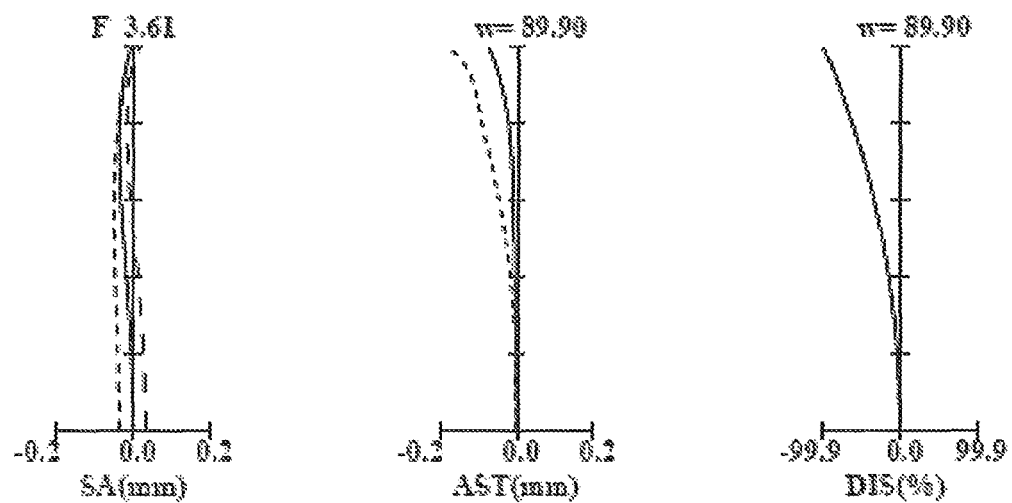
FIG. 2 is a longitudinal aberration diagram, in an infinity in-focus condition, of the imaging optical system according to Embodiment 1.
Figure 3:
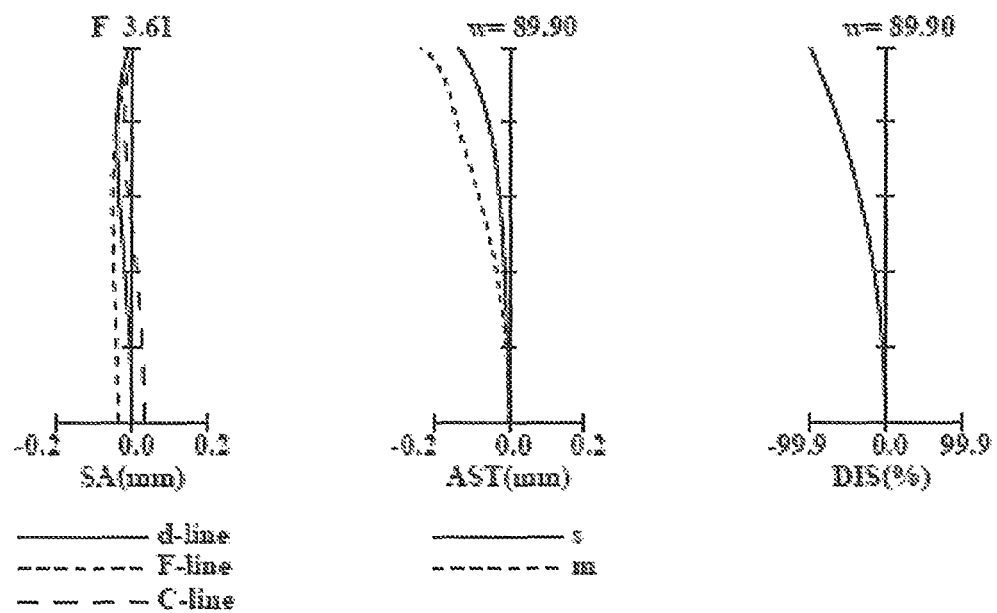
FIG. 3 is a longitudinal aberration diagram, at an object distance of 1 m, of the imaging optical system according to Embodiment 1.

As shown in FIG. 1, in the imaging optical system according to Embodiment 1, the front unit G1 comprises, in order from the object side to the image side, a negative meniscus first lens element L1 with the convex surface facing the object side, a negative meniscus second lens element L2 with the convex surface facing the object side, a positive meniscus third lens element L3 with the convex surface facing the image side, a negative meniscus fourth lens element L4 with the convex surface facing the image side, and a positive meniscus fifth lens element L5 with the convex surface facing the object side. The rear unit G2 comprises, in order from the object side to the image side, a positive meniscus sixth lens element L6 with the convex surface facing the image side, a positive meniscus seventh lens element L7 with the convex surface facing the image side, a negative meniscus eighth lens element L8 with the convex surface facing the image side, a positive meniscus ninth lens element L9 with the convex surface facing the image side, and a bi-convex tenth lens element L10. The seventh lens element L7 and the eighth lens element L8 are cemented with each other. A diaphragm A is arranged between the front unit G1 and the rear unit G2. In focusing from an infinity in-focus condition to a close-object in-focus condition, the ninth lens element L9 in the rear unit G2 moves to the object side along the optical axis.

In the front unit G1 according to Embodiment 1, the first lens element L1 and the second lens element L2, each having a strong diverging effect, have a function of greatly bending a light beam having an incident angle of about 90° to the optical axis, to a direction parallel to the optical axis. A field curvature and magnification chromatic aberration, which are caused by the two negative lens elements, are compensated by using the positive third lens element L3, the negative fourth lens element L4 located with a small air space from the third lens element L3, and the positive fifth lens element L5. The rear unit G2 having positive optical power has a function of forming an image of a light beam from the front unit G1, and mainly compensates spherical aberration and coma aberration. In each of the positive sixth lens element L6, the seventh lens element L7, and the negative eighth lens element L8, since the diameter of a light beam which forms an image at each image height is increased, particularly spherical aberration sensitivity and coma aberration sensitivity due to surface form errors are increased. In the present embodiment, in a region posterior to the diaphragm A, the positive optical power is divided into two, that is, the positive optical power of the sixth lens element L6 and the positive optical power of the seventh lens element L7. Thereby, the spherical aberration sensitivity and the coma aberration sensitivity due to the surface form errors are dispersed.

In the present embodiment, the tenth lens element L10 which is fixed in focusing is arranged closest to the image side. This configuration is adopted in view of the case where the present invention is used as an imaging optical system for an interchangeable-lens type camera system. By fixing the lens element closest to the image side, the focusing mechanism and the like are prevented from being adversely affected by an external force from a finger or the like when the interchangeable lens apparatus is detached from the camera body.

Embodiment 2

Figure 4:
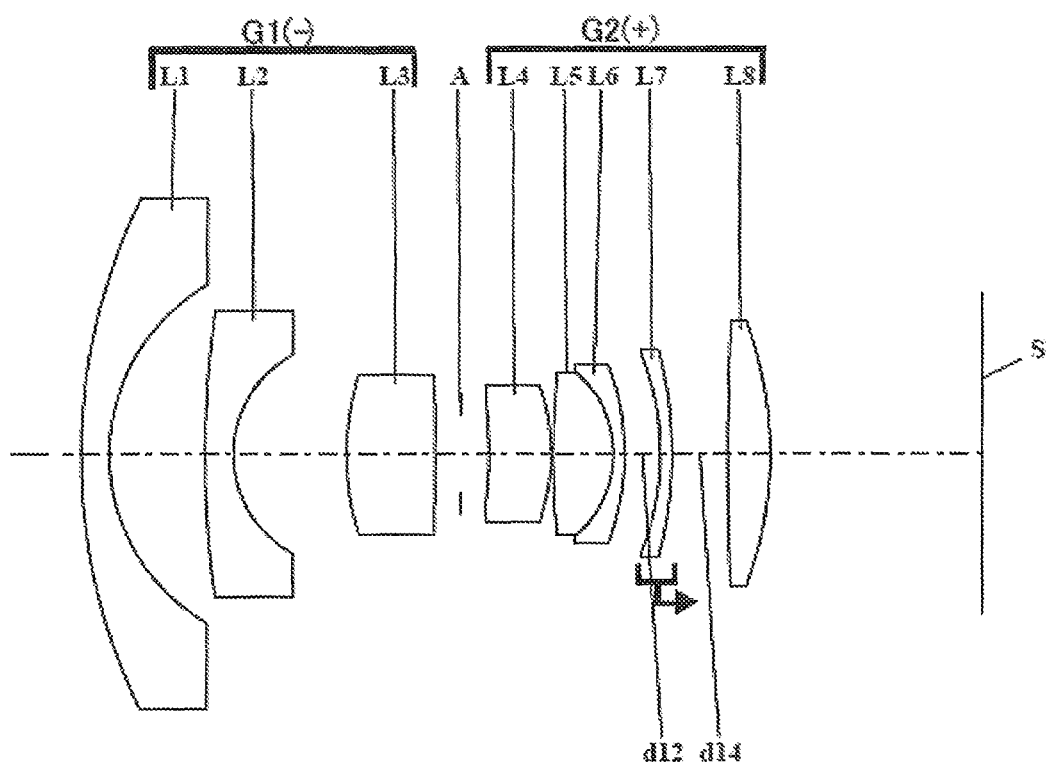
FIG. 4 is a lens arrangement diagram of an imaging optical system according to Embodiment 2.
Figure 5:
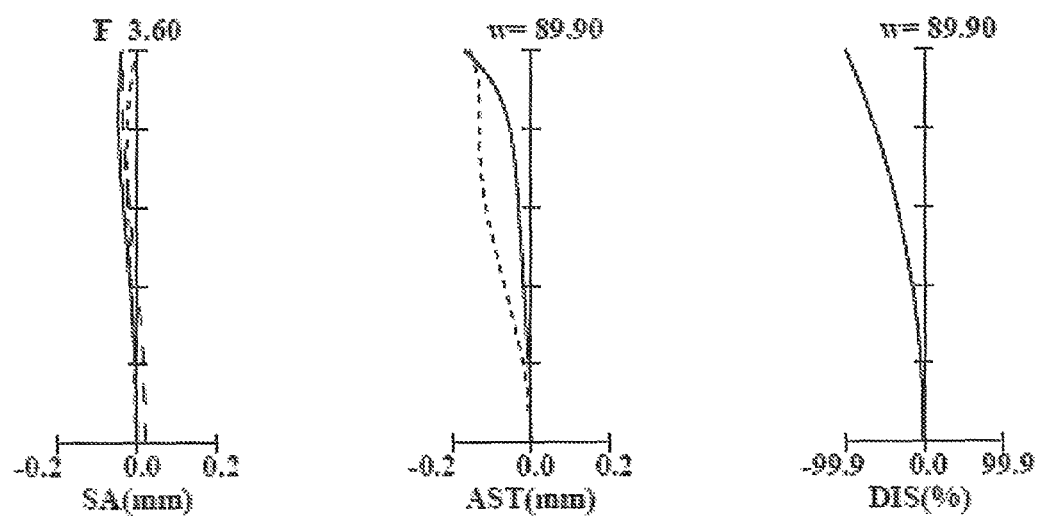
FIG. 5 is a longitudinal aberration diagram, in an infinity in-focus condition, of the imaging optical system according to Embodiment 2.
Figure 6:
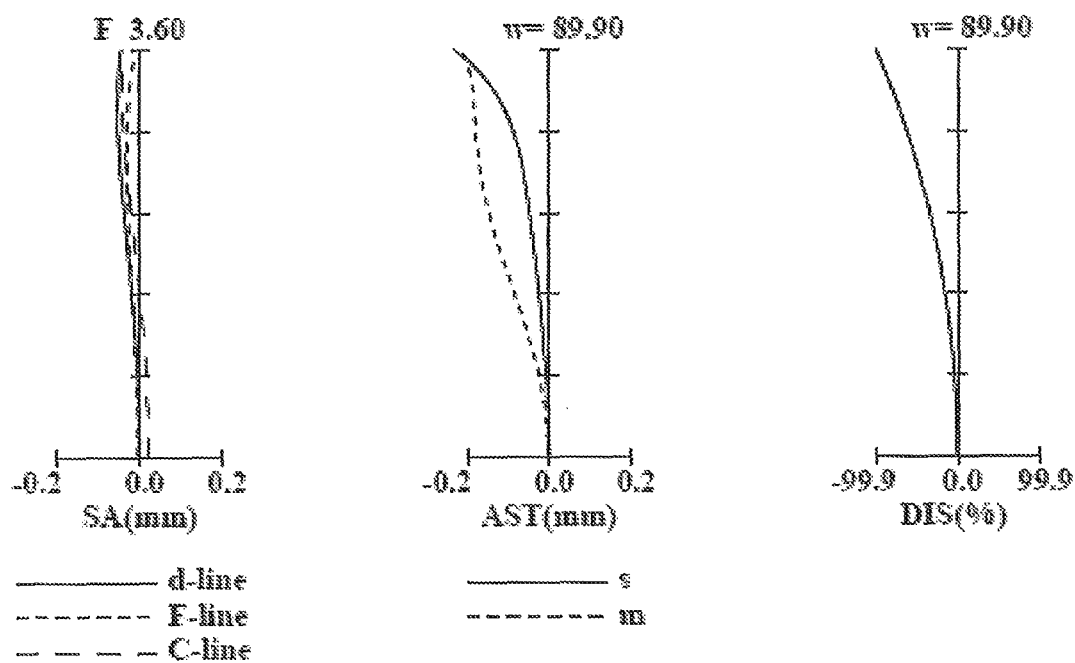
FIG. 6 is a longitudinal aberration diagram, at an object distance of 1 m, of the imaging optical system according to Embodiment 2.

As shown in FIG. 4, in the imaging optical system according to Embodiment 2, the front unit G1 comprises, in order from the object side to the image side, a negative meniscus first lens element L1 with the convex surface facing the object side, a negative meniscus second lens element L2 with the convex surface facing the object side, and a bi-convex third lens element L3. The rear unit G2 comprises, in order from the object side to the image side, a positive meniscus fourth lens element L4 with the convex surface facing the image side, a bi-convex fifth lens element L5, a negative meniscus sixth lens element L6 with the convex surface facing the image side, a negative meniscus seventh lens element L7 with the convex surface facing the image side, and a bi-convex eighth lens element L8. The fifth lens element L5 and the sixth lens element L6 are cemented with each other. A diaphragm A is arranged between the front unit G1 and the rear unit G2. In focusing from an infinity in-focus condition to a close-object in-focus condition, the seventh lens element L7 in the rear unit G2 moves to the image side along the optical axis.

In the front unit G1 according to Embodiment 2, the first lens element L1 and the second lens element L2, each having a strong diverging effect, have a function of greatly bending a light beam having an incident angle of about 90° to the optical axis, to a direction parallel to the optical axis. A field curvature and magnification chromatic aberration, which are caused by the two negative lens elements, are compensated by arranging the positive lens element L3 with an air space on the image side relative to the second lens element L2. The rear unit G2 having positive refractive power has a function of forming an image of a light beam from the front unit G1, and mainly compensates spherical aberration and coma aberration. In each of the positive fourth lens element L4, the fifth lens element L5, and the negative sixth lens element L6, since the diameter of a light beam which forms an image at each image height is increased, particularly spherical aberration sensitivity and coma aberration sensitivity due to surface form errors are increased. In the present embodiment, in a region posterior to the diaphragm A, the positive optical power is divided into two, that is, the positive optical power of the positive lens element L4 and the positive optical power of the positive lens element L5. Thereby, the spherical aberration sensitivity and the coma aberration sensitivity due to the surface form errors are dispersed.

In the present embodiment, the eighth lens element L8 which is fixed in focusing is arranged closest to the image side. This configuration is adopted in view of the case where the present invention is used as an imaging optical system for an interchangeable-lens type camera system. By fixing the lens element closest to the image side, the focusing mechanism and the like are prevented from being adversely affected by an external force from a finger or the like when the interchangeable lens apparatus is detached from the camera body.

Embodiment 3

Figure 7:
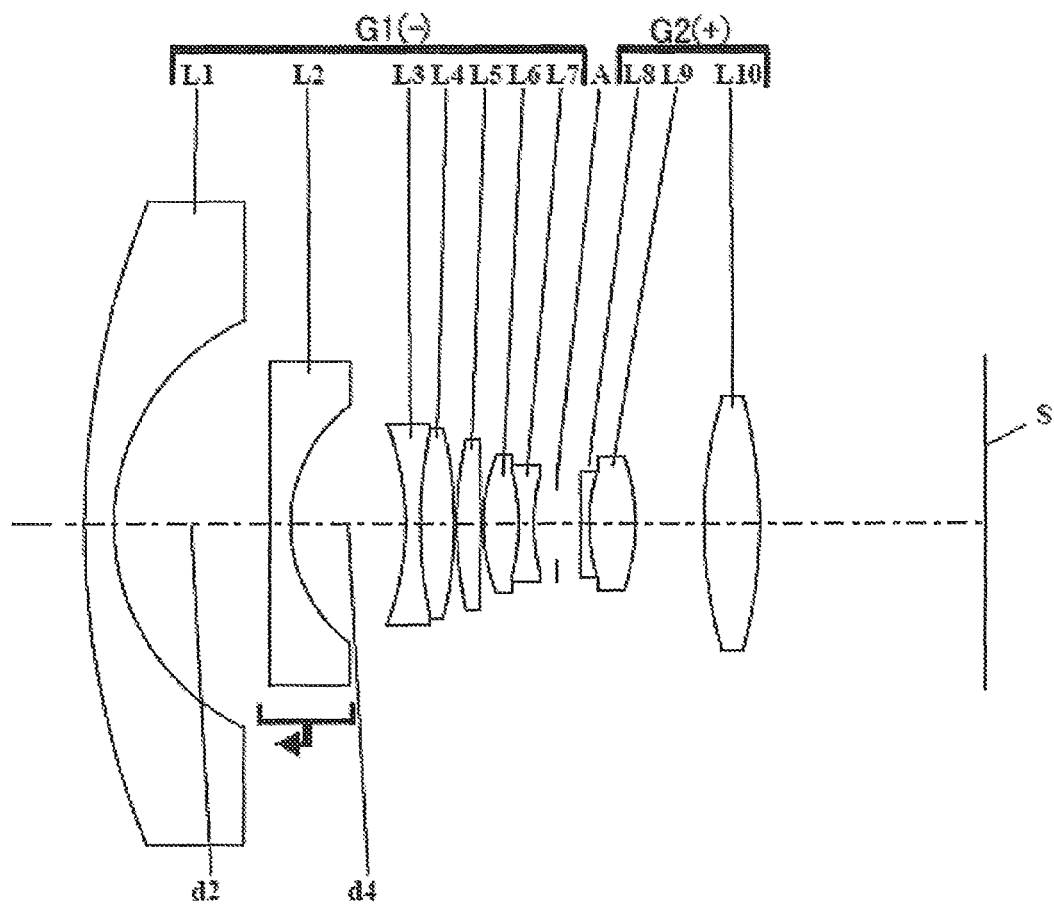
FIG. 7 is a lens arrangement diagram of an imaging optical system according to Embodiment 3.
Figure 8:
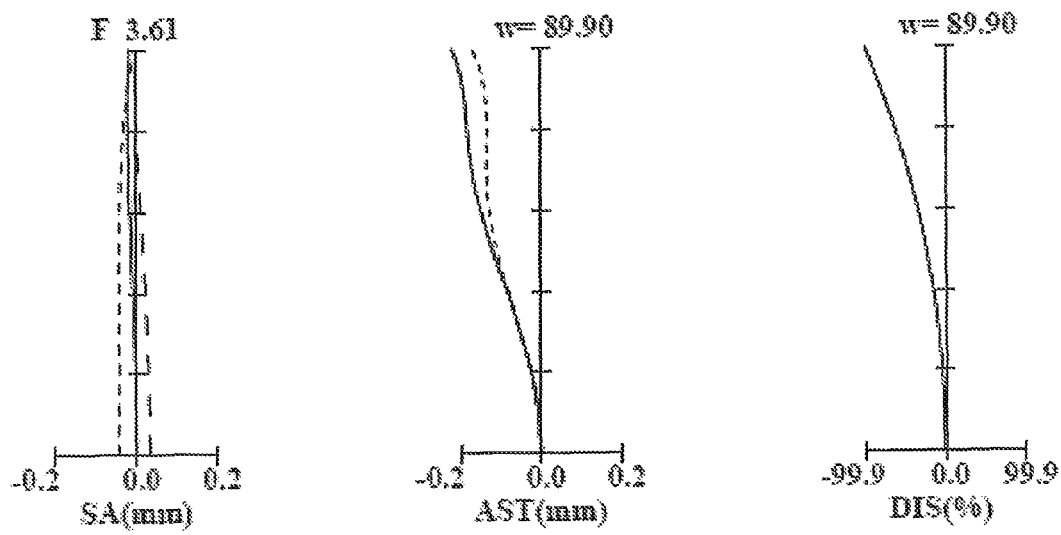
FIG. 8 is a longitudinal aberration diagram, in an infinity in-focus condition, of the imaging optical system according to Embodiment 3.
Figure 9:
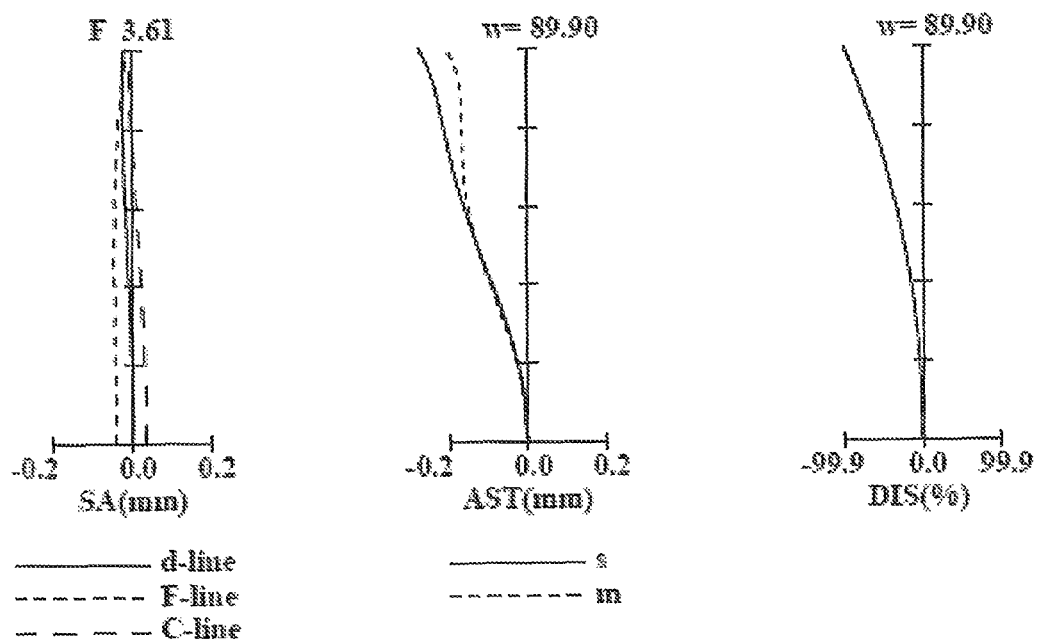
FIG. 9 is a longitudinal aberration diagram, at an object distance of 1 m, of the imaging optical system according to Embodiment 3.

As shown in FIG. 7, in the imaging optical system according to Embodiment 3, the front unit G1 comprises, in order from the object side to the image side, a negative meniscus first lens element L1 with the convex surface facing the object side, a plano-concave second lens element L2 with the concave surface facing the image side, a bi-concave third lens element L3, a bi-convex fourth lens element L4, a bi-convex fifth lens element L5, a bi-convex sixth lens element L6, and a bi-concave seventh lens element L7. The third lens element L3 and the fourth lens element L4 are cemented with each other. The sixth lens element L6 and the seventh lend element L7 are cemented with each other. The rear unit G2 comprises, in order from the object side to the image side, a bi-concave eighth lens element L8, a bi-convex ninth lens element L9, and a bi-convex tenth lens element L10. A diaphragm A is arranged between the front unit G1 and the rear unit G2. In focusing from an infinity in-focus condition to a close-object in-focus condition, the second lens element L2 in the front unit G1 moves to the object side along the optical axis.

In the front unit G1 according to Embodiment 3, the first lens element L1 and the second lens element L2, each having a strong diverging effect, have a function of greatly bending a light beam having an incident angle of about 90° to the optical axis, to a direction parallel to the optical axis. A field curvature and magnification chromatic aberration, which are caused by the two negative lens elements, are compensated by arranging a doublet lens composed of the third lens element L3 and the fourth lens element L4 with an air space on the image side relative to the second lens element L2, the fifth lens element, and a doublet lens composed of the sixth lens element L6 and the seventh lens element L7.

The rear unit G2 having positive refractive power has a function of forming an image of a light beam from the front unit G1, and successfully compensates aberration of an off-axis light beam, particularly, coma aberration. An air space between the ninth lens element L9 and the tenth lens element L10 is for ensuring telecentricity of the off-axis light beam, and is desired to satisfy the following condition.

$$3.0 < FL/D3 < 9.0$$

where

FL is a focal length of the positive tenth lens element L10, and

D3 is an air space between the positive ninth lens element L9 and the positive tenth lens element L10.

If the focal length of the tenth lens element L10 is increased exceeding the upper limit, the field curvature becomes excessive toward the over side, although such an increase in the focal length is desirable in ensuring the telecentricity. On the other hand, if the focal length of the tenth lens element L10 is shortened below the lower limit, the field curvature becomes excessive toward the under side.

Embodiment 4

Figure 10:
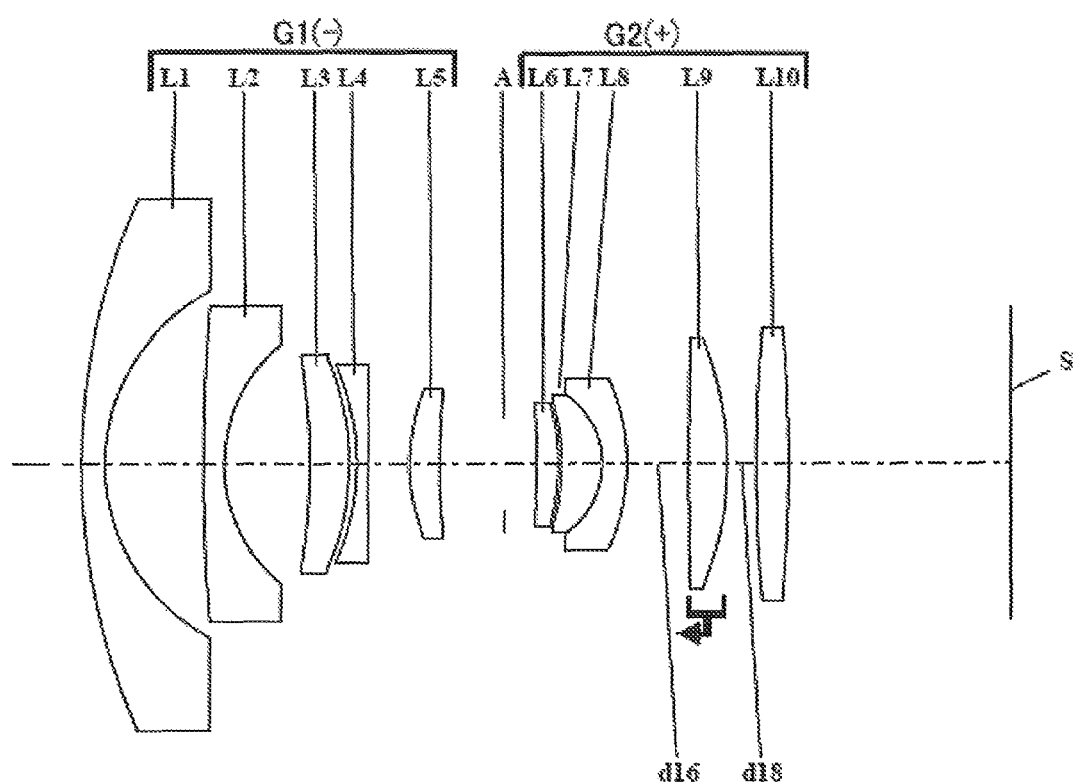
FIG. 10 is a lens arrangement diagram of an imaging optical system according to Embodiment 4.
Figure 11:
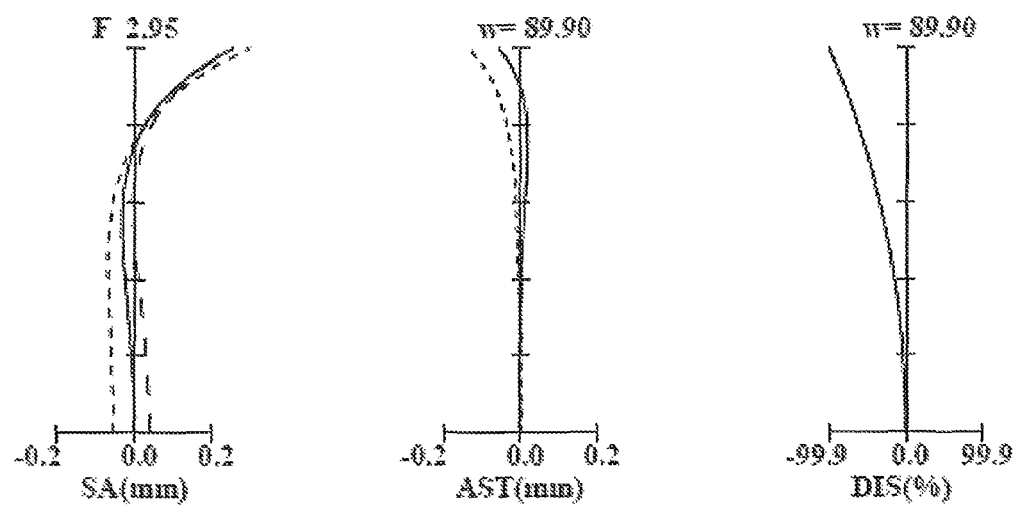
FIG. 11 is a longitudinal aberration diagram, in an infinity in-focus condition, of the imaging optical system according to Embodiment 4.
Figure 12:
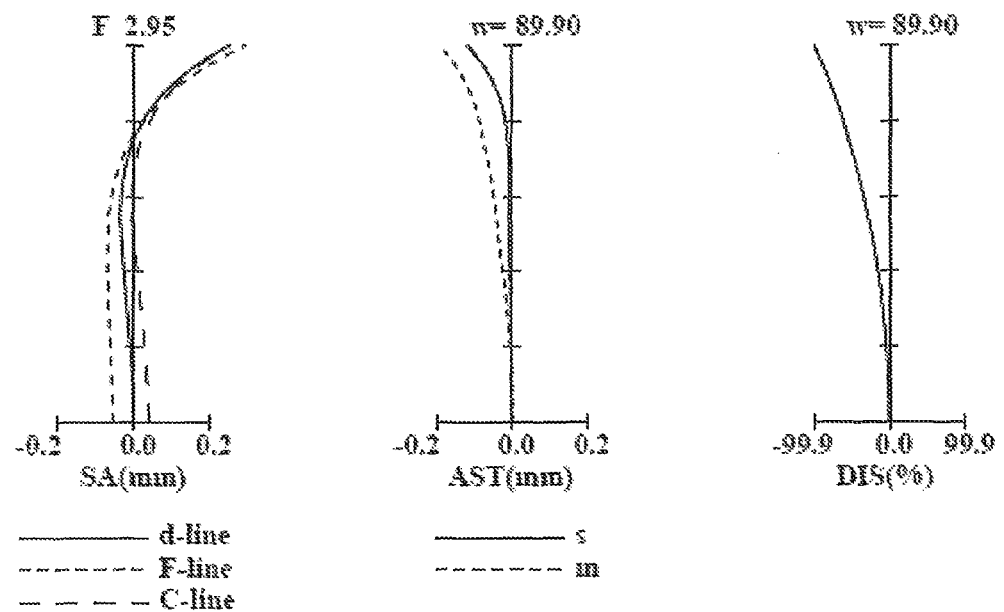
FIG. 12 is a longitudinal aberration diagram, at an object distance of 1 m, of the imaging optical system according to Embodiment 4.

As shown in FIG. 10, in the imaging optical system according to Embodiment 4, the front unit G1 comprises, in order from the object side to the image side, a negative meniscus first lens element L1 with the convex surface facing the object side, a negative meniscus second lens element L2 with the convex surface facing the object side, a positive meniscus third lens element L3 with the convex surface facing the image side, a bi-concave fourth lens element L4, and a positive meniscus fifth lens element L5 with the convex surface facing the object side. The rear unit G2 comprises, in order from the object side to the image side, a positive meniscus sixth lens element L6 with the convex surface facing the image side, a positive meniscus seventh lens element L7 with the convex surface facing the image side, a negative meniscus eighth lens element L8 with the convex surface facing the image side, a bi-convex ninth lens element L9, and a bi-convex tenth lens element L10. The seventh lens element L7 and the eighth lens element L8 are cemented with each other. A diaphragm A is arranged between the front unit G1 and the rear unit G2. In focusing from an infinity in-focus condition to a close-object in-focus condition, the ninth lens element L9 in the rear unit G2 moves to the object side along the optical axis.

In the front unit G1 according to Embodiment 4, the first lens element L1 and the second lens element L2, each having a strong diverging effect, has a function of greatly bending a light beam having an incident angle of about 90° to the optical axis, to a direction parallel to the optical axis. A field curvature and magnification chromatic aberration, which are caused by the two negative lens elements, are compensated by arranging the negative fourth lens element L4 with a small air space on the image side relative to the positive third lens element L3, and arranging the positive fifth lens element L5 with an air space on the image side relative to the fourth lens element L4.

The rear unit G2 having positive refractive power has a function of forming an image of a light beam from the front unit G1, and mainly compensates spherical aberration and coma aberration. In each of the positive sixth lens element L6, the seventh lens element L7, and the negative eighth lens element L8, since the diameter of a light beam which forms an image at each image height is increased, particularly spherical aberration sensitivity and coma aberration sensitivity due to surface form errors are increased. In the present embodiment, on the image side relative to the diaphragm A, the positive sixth lens element L6 and a doublet lens composed of the positive seventh lens element L7 and the negative eighth lens element L8 are provided to disperse the aberration sensitivities due to the surface form errors.

In the present embodiment, the tenth lens element L10 which is fixed in focusing is arranged closest to the image side. This configuration is adopted in view of the case where the present invention is used as an imaging optical system for an interchangeable-lens type camera system. By fixing the lens element closest to the image side, a focusing mechanism and the like are prevented from being adversely affected by an external force of a finger or the like when the interchangeable lens apparatus is detached from the camera body.

Embodiment 5

Figure 13:
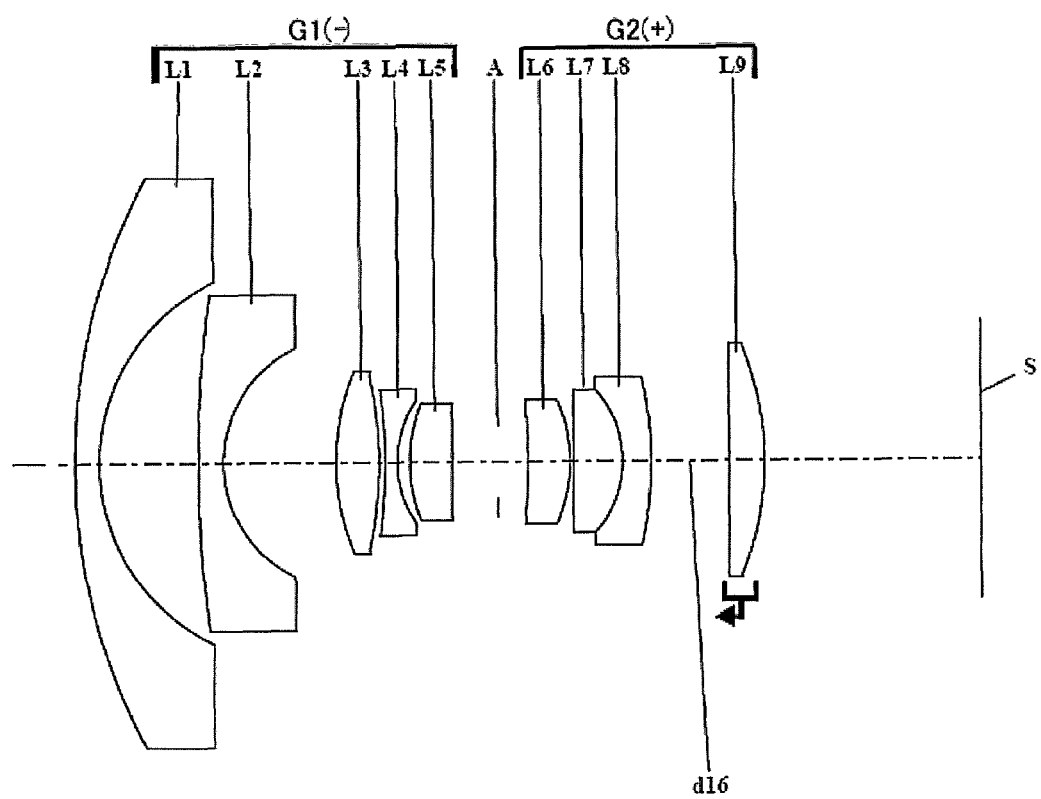
FIG. 13 is a lens arrangement diagram of an imaging optical system according to Embodiment 5.
Figure 14:
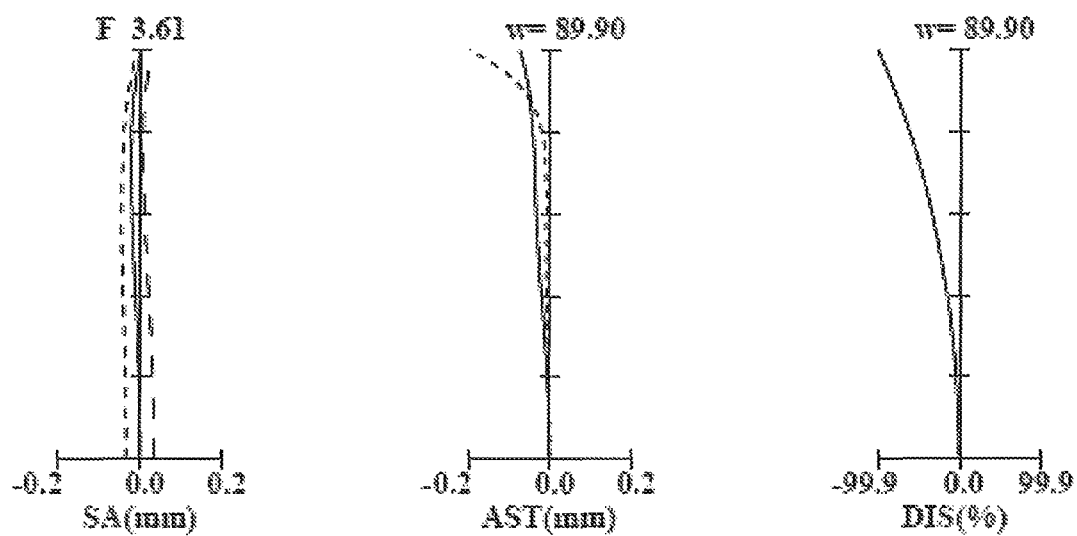
FIG. 14 is a longitudinal aberration diagram, in an infinity in-focus condition, of the imaging optical system according to Embodiment 5.
Figure 15:
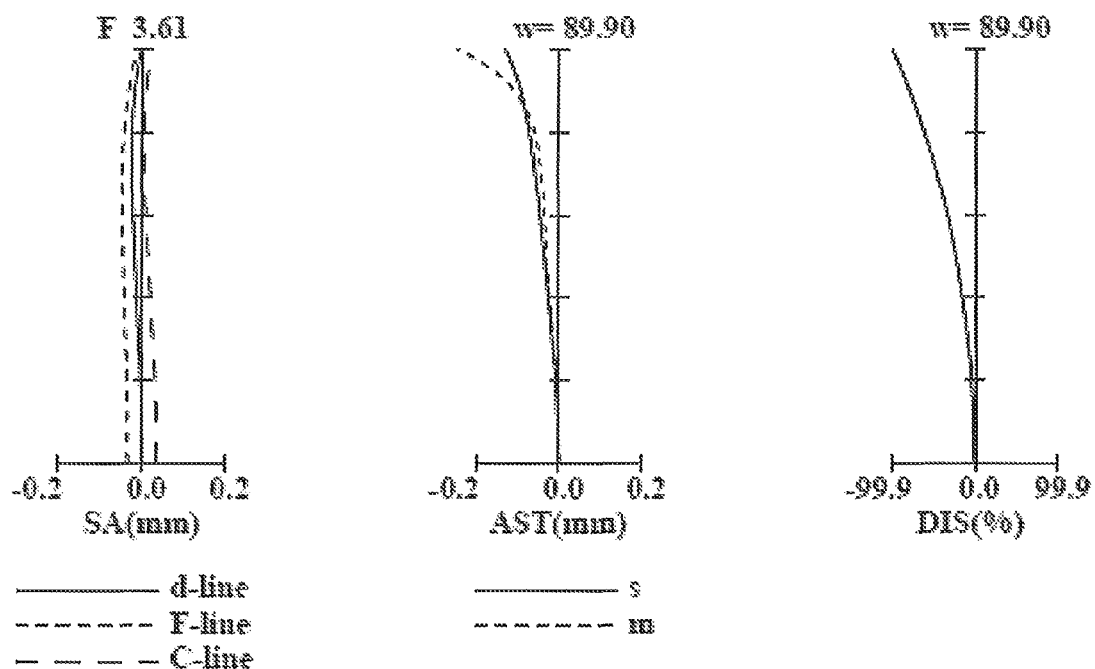
FIG. 15 is a longitudinal aberration diagram, at an object distance of 1 m, of the imaging optical system according to Embodiment 5.

As shown in FIG. 13, in the imaging optical system according to Embodiment 5, the front unit G1 comprises, in order from the object side to the image side, a negative meniscus first lens element L1 with the convex surface facing the object side, a negative meniscus second lens element L2 with the convex surface facing the object side, a bi-convex third lens element L3, a bi-concave fourth lens element L4, and a positive meniscus fifth lens element L5 with the convex surface facing the object side. The rear unit G2 comprises, in order from the object side to the image side, a plano-convex sixth lens element L6 with the convex surface facing the image side, a plano-convex seventh lens element L7 with the convex surface facing the image side, a negative meniscus eighth lens element L8 with the convex surface facing the image side, and a plano-convex ninth lens element L9 with the convex surface facing the image side. The seventh lens element L7 and the eighth lens element L8 are cemented with each other. A diaphragm A is arranged between the front unit G1 and the rear unit G2. In focusing from an infinity in-focus condition to a close-object in-focus condition, the ninth lens element L9 in the rear unit G2 moves to the object side along the optical axis.

In the front unit G1 according to Embodiment 5, the first lens element L1 and the second lens element L2, each having a strong diverging effect, function to greatly bend a light beam having an incident angle of about 90° to the optical axis, to a direction parallel to the optical axis. A field curvature and magnification chromatic aberration, which are caused by the two negative lens elements, are compensated by arranging the positive third lens element L3, the negative fourth lens element L4, and the positive fifth lens element L5 with an air space on the image side relative to the fourth lens element L4.

The rear unit G2 having positive optical power has a function of forming an image of a light beam from the front unit G1, and mainly compensates spherical aberration and coma aberration. In each of the positive sixth lens element L6, the seventh lens element L7, and the negative eighth lens element L8, since the diameter of a light beam which forms an image at each image height is increased, particularly spherical aberration sensitivity and coma aberration sensitivity due to surface form errors are increased. In the present embodiment, on the image side relative to the diaphragm A, the positive sixth lens element L6 and a doublet lens composed of the positive seventh lens element L7 and the negative eighth lens element L8 are arranged to disperse the aberration sensitivities due to the surface form errors. Further, in Embodiment 5, no fixed lens is arranged closest to the image side. Even when no fixed lens is arranged closest to the image side, an imaging optical system suitable for high-speed auto-focusing is achieved.

The following will describe the conditions preferred to be satisfied by the imaging optical systems according to Embodiments 1 to 5. Here, a plurality of preferable conditions are set forth, and a construction of an imaging optical system that satisfies all the plurality of conditions is most desirable. However, when an individual condition is satisfied, an imaging optical system having the corresponding effect can be obtained.

In the imaging optical system according to any of Embodiments 1 to 5, which comprises, in order from the object side to the image side, a front unit including a negative lens element arranged closest to the object side, an aperture diaphragm, and a rear unit having positive optical power, and in which, in focusing from an infinity in-focus condition to a close-object in-focus condition, the negative lens closest to the object side and the aperture diaphragm are fixed relative to the image surface, and a lens in the front unit or the rear unit moves along the optical axis, the following condition (1) is satisfied.

$$0.9 < R/f < 2.0 \quad (1)$$

where

R is an average between an image side curvature radius of the negative lens element arranged closest to the object side, and an image side curvature radius of the second negative lens element from the object side among all the negative lens elements, and f is a focal length of the entire system.

The condition (1) is a condition for suppressing an increase in the size of the lens barrel, ensuring processability of the negative lens element arranged on the object side in the imaging optical system, and further, providing an appropriate back focus. If the value goes below the lower limit of the condition (1), the curvature radius of the negative lens on the image surface side is reduced, which makes it difficult to ensure a surface accuracy of a peripheral part of the lens when a polishing process is performed. As a result, the processing man-hour is significantly increased, leading to high costs. Moreover, since the back focus is increased, the compactness is deteriorated. Therefore, this situation is not desirable. On the other hand, if the value exceeds the upper limit of the condition (1), the curvature radius of the negative lens element on the image surface side is increased, and the negative optical power of the negative lens element arranged on the object side is reduced. This reduction in the negative optical power causes an increase in the diameter of each lens element in the front unit, and a reduction in the peripheral light quantity. Therefore, this situation is not desirable.

As described in Embodiments 1 to 5, the lens which moves along the optical axis in focusing is preferably a single lens element.

It is desirable to adopt, as a focusing lens, a lens element which can attain a reduction in weight, such as a single lens element, a cemented lens, a resin lens element, or a composite aspheric lens element in which an aspheric resin layer is formed on a surface of a glass lens.

The imaging optical system according to any of Embodiments 1 to 5 preferably satisfies the following condition (2).

$$2.0 < \Sigma_d/f < 12.0 \quad (2)$$

where $\Sigma_d$ is an optical axial distance from a surface closest to the object side to a surface closest to the image side in the entire system, and f is a focal length of the entire system.

The condition (2) is a condition for obtaining an optimum back focus and an optimum outer diameter of the lens barrel. If the value goes blow the lower limit of the condition (2), the overall length of the optical system becomes too short, which causes a problem that, when the imaging optical system is used in an interchangeable lens apparatus, a part of the body of a photographer or a projecting part of a camera body or a grip is undesirably photographed. Therefore, this situation is not desirable. On the other hand, if the value exceeds the upper limit of the condition (2), the front lens diameter is increased in addition to the increase in the overall length of the optical system, which makes it impossible to realize a compact imaging optical system.

When the above-described condition (2) is satisfied, it is more preferable that the imaging optical system according to any of Embodiment 1 to 5 satisfies at least one of the following conditions (2)' and (2)". When at least one of the conditions (2)' and (2)" is satisfied, the effect obtained when the condition (2) is satisfied is further enhanced.

$$7.0 < \Sigma_d/f \quad (2)'$$

$$\Sigma_d/f < 11.0 \quad (2)''$$

The imaging optical system according to any of Embodiments 1 to 5 preferably satisfies the following condition (3).

$$20 < V_n - V_p < 50 \quad (3)$$

where $V_n$ is an average of Abbe numbers to the d-line of the negative lens elements included in the front unit, and $V_p$ is an average of Abbe numbers to the d-line of the positive lens elements included in the front unit.

The condition (3) is a condition for compensating magnification chromatic aberration, which occurs on the object-side surface of the negative lens element arranged closest to the object side, by using the subsequent lens elements in the front unit G1. If the value goes below the lower limit of the condition (3), it becomes difficult to compensate the magnification chromatic aberration due to the negative lens element in the front unit G1 by using the subsequent lens elements. Therefore, this situation is not desirable. On the other hand, if the value exceeds the upper limit of the condition (3), it becomes difficult to constitute the lens elements by using an existing glass material, in addition to the difficulty in compensating the magnification chromatic aberration.

The imaging optical system according to any of Embodiments 1 to 5 preferably satisfies the following conditions (4) and (5).

$$-4.0 < ff/fG < 3.0 \quad (4)$$

$$1.1 < f_2/f < 4.2 \quad (5)$$

where ff is a focal length of a lens element which moves in focusing, fG is a composite focal length of a lens unit including the lens element which moves in focusing, $f_2$ is a composite focal length of the rear unit, and f is a focal length of the entire system.

The condition (4) sets forth the focal length of the focusing lens while suppressing aberration fluctuation in the imaging optical system to maintain high imaging performance. If the value goes below the lower limit of the condition (4), the focal length of the focusing lens is shortened, and thereby the amount of movement of the focusing lens is reduced, which is effective for downsizing of the lens barrel. However, it becomes difficult to compensate magnification chromatic aberration and astigmatism, and the difficulty in manufacturing is increased because a very high manufacturing accuracy is required. On the other hand, if the value exceeds the upper limit of the condition (4), the focal length of the focusing lens is increased, and the amount of movement required for focusing is increased, which causes an increase in the sizes of the focusing lens and the lens barrel. Therefore, this situation is not desirable.

The condition (5) sets forth the focal length of the rear unit, for successfully compensating the various aberrations, and ensuring a short overall length and a sufficient back focus. If the value goes below the lower limit of the condition (5), the focal length of the rear unit is shortened, outward coma aberration occurs prominently, and the field curvature becomes excessive toward the under side, which makes it impossible to maintain the imaging performance. Therefore, this situation is not desirable. On the other hand, if the value exceeds the upper limit of the condition (5), the focal length of the rear unit is elongated, and the overall length of the optical system is shortened. However, inward coma aberration occurs prominently, and the field curvature becomes excessive toward the over side, which makes it impossible to maintain the imaging performance. Therefore, this situation is not desirable.

The imaging optical system according to any of Embodiments 1 to 5 preferably satisfies the following condition (6) or (7).

$$0.2 < \beta_p < 0.8 \quad (6)$$

$$1.0 < \beta_n < 1.8 \quad (7)$$

where $\beta_p$ is a paraxial imaging magnification in an infinity in-focus condition of a positive lens element which moves in focusing, and $\beta_n$ is a paraxial imaging magnification in an infinity in-focus condition of a negative lens element which moves in focusing.

The condition (6) is for improving the balance between the optical axial length of the rear unit including the focusing lens, and the imaging performance. If the value goes below the lower limit of the condition (6), the amount of movement required in focusing is increased, which causes an increase in the overall length of the optical system. Therefore, this situation is not desirable. On the other hand, if the value exceeds the upper limit of the condition (6), the amount of movement in focusing is reduced, which is effective for a reduction in the overall length of the optical system. However, the imaging performance at a close distance is deteriorated. Therefore, this situation is not desirable.

The condition (7) is for improving the balance between the optical axial length of the front unit or the rear unit including the focusing lens, and the imaging performance. If the value goes below the lower limit of the condition (7), the magnification is reduced, and the amount of movement required in focusing is increased, which causes an increase in the overall length of the optical system. Therefore, this situation is not desirable. Particularly when the focusing lens is arranged in the front unit, the front lens diameter is increased, and simultaneously, it becomes difficult to ensure a relative illumination. On the other hand, if the value exceeds the upper limit of the condition (7), the magnification is increased, and when the focusing lens is included in the front unit, the field curvature becomes excessive toward the under side, which makes it difficult to constitute an optical system with less number of lens elements. On the other hand, when the focusing lens is included in the rear unit, the amount of movement of the focusing lens is reduced, which is effective for a reduction in the overall length of the optical system. However, the focusing lens strongly flips up an off-axis light beam, which causes an increase in the outer diameter of the subsequent lens element. As a result, the outer configuration of the rear part of the lens barrel cannot keep the desired size. This situation is not desirable.

The imaging optical system according to any of Embodiments 1 to 5 preferably satisfies the following condition (8).

$$0.01 < D_1/f < 0.20 \tag{8}$$

where $D_1$ is an air space between a positive lens element which is arranged closest to the object side, and a negative lens element which is arranged adjacent to the positive lens element on the image side, and f is a focal length of the entire system.

The condition (8) sets forth an air space between a positive lens element which is arranged closest to the object side among all the lens elements, and a negative lens element which is arranged adjacent to the positive lens element on the image side. The condition (8) is particularly necessary in compensating an astigmatic difference from an image height of 60% to an image height of 100%. If the value goes below the lower limit of the condition (8), the air space is reduced, and a meridional image surface shifts toward the over side in focusing to an infinite distance object, which makes it impossible to secure the imaging performance. Therefore, this situation is not desirable. On the other hand, if the value exceeds the upper limit of the condition (8), the air space is increased, and the meridional image surface shifts toward the under side, which makes it impossible to secure the imaging performance. Therefore, this situation is not desirable.

The individual lens elements constituting the imaging optical systems according to Embodiments 1 to 5 are each composed exclusively of refractive type lens elements that deflect incident light by refraction (that is, lens elements of a type in which deflection is achieved at the interface between media having different refractive indices). However, the present invention is not limited to this construction. For example, the imaging optical systems may be constituted of: diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed at the interface between media having different refractive indices, wavelength dependence of the diffraction efficiency is improved. Therefore, such a configuration is preferable.

Embodiment 6

Figure 16:
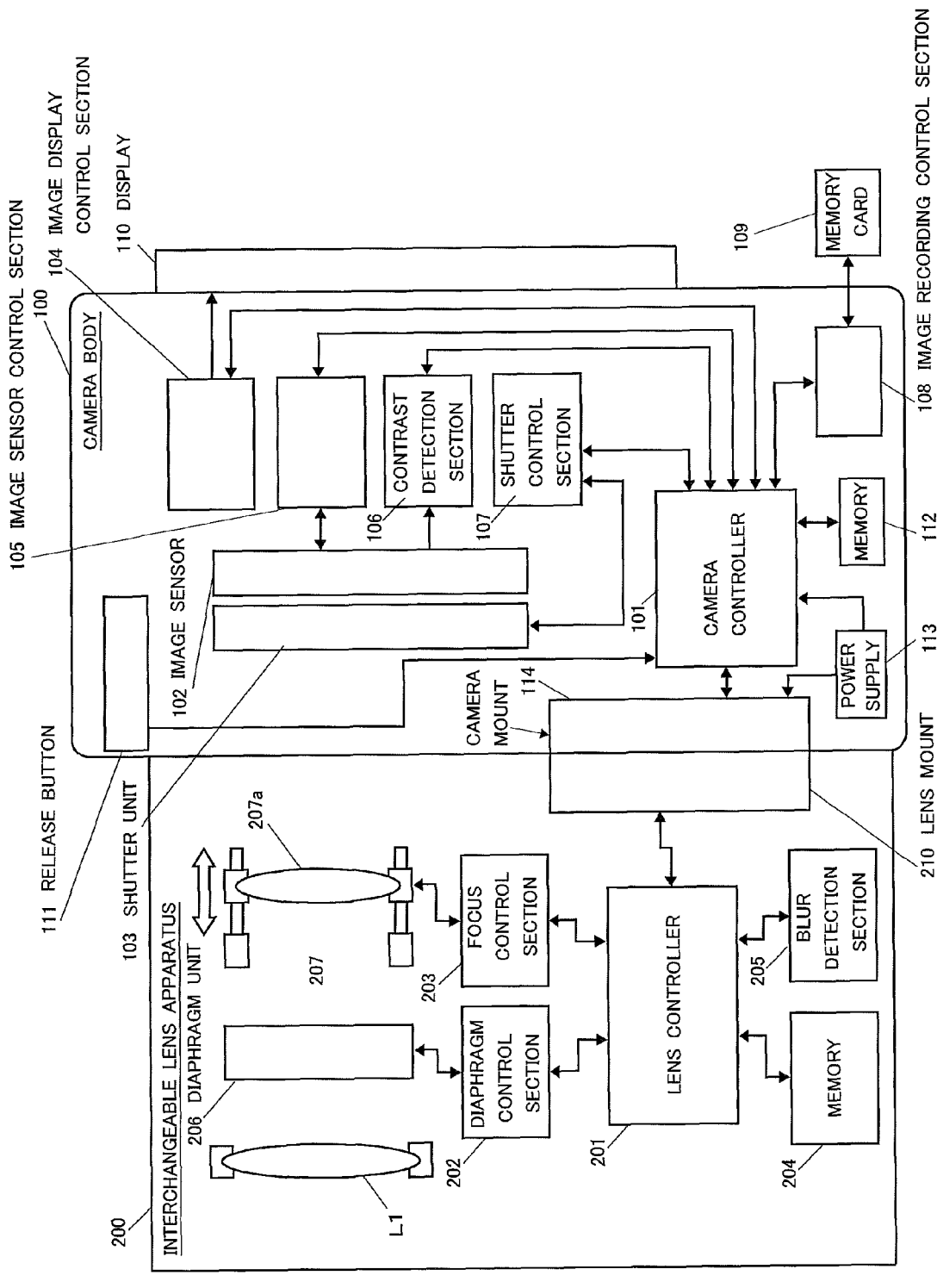
FIG. 16 is a schematic construction diagram of a camera system according to Embodiment 6.

FIG. 16 is a schematic construction diagram of a camera system according to Embodiment 6. The camera system according to Embodiment 6 includes a camera body 100, and an interchangeable lens apparatus 200.

The camera body 100 includes a camera controller 101, an image sensor 102, a shutter unit 103, an image display control section 104, an image sensor control section 105, a contrast detection section 106, a shutter control section 107, an image recording control section 108, a display 110, a release button 111, a memory 112, a power supply 113, and a camera mount 114.

The camera controller 101 is an arithmetic operation unit for controlling the entire camera system. The camera controller 101 is electrically connected to the image display control section 104, the image sensor control section 105, the contrast detection section 106, the shutter control section 107, the image recording control section 108, the memory 112 and the camera mount 114, and can exchange signals with these sections. Further, the camera controller 101 is electrically connected to the release button 111, and receives a signal generated when the release button 111 is operated. Moreover, the camera controller 101 is connected to the power supply 113.

The image sensor 102 is, for example, a C-MOS sensor. The image sensor 102 converts an optical image incident on a light receiving surface into image data, and then outputs the image data. The image sensor 102 is driven in accordance with a driving signal from the image sensor control section 105. In response to a control signal from the camera controller 101, the image sensor control section 105 outputs a driving signal for driving the image sensor 102, and outputs, to the camera controller 101, the image data outputted from the image sensor 102. In response to a control signal from the camera controller 101, the contrast detection section 106 calculates and detects a contrast from the image data outputted from the image sensor 102, and then outputs the contrast to the camera controller 101.

The shutter unit 103 includes a shutter plate for shutting off the optical path of the image light incident on the image sensor 102. The shutter unit 103 is driven in accordance with a driving signal from the shutter control section 107. In response to a control signal from the camera controller 101, the shutter control section 107 controls the open/close timing for the shutter plate of the shutter unit 103.

The display 110 is, for example, a liquid crystal display unit. The display 110 is driven in accordance with a driving signal from the image display control section 104, and displays an image on a display surface thereof. In response to a control signal from the camera controller 101, the image display control section 104 outputs image data to be displayed on the display 110 and a driving signal for driving the display 110.

In response to a control signal from the camera controller 101, the image recording control section 108 outputs the image data to a memory card 109 connected in an attachable and detachable manner.

The camera mount 114 mechanically connects the camera body 100 to the interchangeable lens apparatus 200 described later. Further, the camera mount 114 serves also as an interface for electrically connecting the camera body 100 to the interchangeable lens apparatus 200 described later.

The interchangeable lens apparatus 200 includes a lens controller 201, a diaphragm control section 202, a focus control section 203, a memory 204, a diaphragm unit 206, an imaging optical system 207, and a lens mount 210.

The lens controller 201 is an arithmetic operation unit for controlling the entirety of the interchangeable lens apparatus 200, and is connected through the lens mount 210 and the camera mount 114 to the camera controller 101 in the camera body described above. The lens controller 201 is electrically connected to the diaphragm control section 202, the focus control section 203, the memory 204 and the blur detection section 205, and can exchange signals with these sections.

The imaging optical system 207 is an imaging optical system according to Embodiment 1 described above. The imaging optical system 207 includes a focusing lens unit 207a. Since the focusing lens unit 207a is schematically illustrated for simplicity of description, the actual construction of the imaging optical system is not directly illustrated. The focusing lens unit 207a is moved in a direction along the optical axis to perform focusing.

In response to a control signal from the lens controller 201, the diaphragm control section 202 detects and outputs the present position of the diaphragm unit 206. Further, the diaphragm control section 202 outputs a driving signal for driving diaphragm blades included in the diaphragm unit 206 to open and close the diaphragm, and thus varies the F-number of the optical system.

In response to a control signal from the lens controller 201, the focus control section 203 detects and outputs the present position of the focusing lens unit 207a. Further, the focus control section 203 outputs a driving signal for driving focusing lens unit 207a to drive the focusing lens unit 207a in a direction along the optical axis.

In the above-mentioned configuration, when the release button 111 is pressed half, the camera controller 101 executes a routine of auto-focusing. Firstly, the camera controller 101 communicates with the lens controller 201 through the camera mount 114 and the lens mount 210, and detects the states of the focusing lens unit 207a and the diaphragm unit 206.

Next, based on a control signal, the lens controller 201 controls the focus control section 203 to drive and wobble the focusing lens unit 207a. At the same time, the camera controller 101 communicates with the lens controller 201 through the camera mount 114 and the lens mount 210, and outputs a control signal for instructing the lens controller 201 to adjust the F-number to a predetermined value. Based on the control signal, the lens controller 201 controls the diaphragm control section 202 to drive the diaphragm blades of the diaphragm unit 206 in accordance with the predetermined F number.

On the other hand, the camera controller 101 outputs control signals to the image sensor control section 105 and the contrast detection section 106. The image sensor control section 105 and the contrast detection section 106 individually obtain an output from the image sensor 102, in association with the sampling frequency of the wobbling drive of the focusing lens unit 207a. Based on the control signal from the camera controller 101, the image sensor control section 105 transmits the image data corresponding to the optical image to the camera controller 101. The camera controller 101 performs predetermined image processing on the image data, and then transmits the resultant image data to the image display control section 104. The image display control section 104 displays the image data as a visible image on the display 110.

The contrast detection section 106 calculates the contrast value of the image data in association with wobbling, and then transmits the contrast value to the camera controller 101. Based on the detection result from the contrast detection section 106, the camera controller 101 determines the direction and amount of focusing movement of the focusing lens unit, and then transmits, to the lens controller 201, information relating to the direction and amount of focusing movement. The lens controller 201 outputs a control signal to the focus control section 203 to drive the focusing lens unit 207a. Based on the control signal from the lens controller 201, the focus control section 203 drives the focusing lens unit 207a.

When performing auto-focusing in a live view state, the above-mentioned operation is repeated. When performing auto-focusing in a live view state, wobbling of the focusing lens unit 207a is performed continuously. At that time, the imaging optical system according to Embodiment 1 has a small variation in image magnification caused by the wobbling, and has a light weight. Therefore, the imaging optical system is suitable for the life view state and video shooting.

In Embodiment 6 described above, the imaging optical system according to Embodiment 1 is employed. However, it is understood that an imaging optical system according to any other embodiment may be employed.

Further, an imaging apparatus comprising an imaging optical system according to any of Embodiments 1 to 5 described above and an image sensor such as a CCD or a CMOS may be applied to an interchangeable-lens type camera system, a monitor camera in a monitor system, a Web camera, an in-vehicle camera and the like.

NUMERICAL EXAMPLES

The following will describe numerical examples in which the imaging optical systems according to Embodiments 1 to 5 are implemented. As described later, Numerical Examples 1 to 5 corresponds to Embodiments 1 to 5, respectively. Here, in each numerical example, the units of length in tables are all "mm", and the units of view angle are all "°". Moreover, in each numerical example, r is the radius of curvature, d is the axial distance, nd is the refractive index to the d-line, and vd is the Abbe number to the d-line.

FIGS. 2, 5, 8, 11, and 14 are longitudinal aberration diagrams, in an infinity in-focus condition, of the imaging optical systems according to Embodiments 1, 2, 3, 4, and 5, respectively. FIGS. 3, 6, 9, 12, and 15 are longitudinal aberration diagrams, at an object distance of 1 m, of the imaging optical systems according to Embodiments 1, 2, 3, 4, and 5, respectively.

Each longitudinal aberration diagram shows, in order from the left-hand side, the spherical aberration (SA (mm)), the astigmatism (AST (mm)), and the distortion (DIS (%)). In each spherical aberration diagram, the vertical axis indicates the F-number (in each Fig., indicated as F), and the solid line, the short dash line, and the long dash line indicate the characteristics to the d-line, the F-line, and the C-line, respectively. In each astigmatism diagram, the vertical axis indicates the vertical axis indicates the half view angle (in each Fig., indicated as W), and the solid line and the dash line indicate the characteristics to the sagittal plane (in each Fig., indicated as "s") and the meridional plane (in each Fig., indicated as "m"), respectively. In each distortion diagram, the vertical axis indicates the half view angle (in each Fig., indicated as W).

Numerical Example 1

The imaging optical system of Numerical Example 1 corresponds to Embodiment 1 shown in FIG. 1. Surface data and various data of the imaging optical system according to Numerical Example 1 are shown in Table 1 and Table 2, respectively.

TABLE 1

(Surface data)

| Surface number | r | d | nd | vd |
|---|---|---|---|---|
| Object surface | ∞ | Variable | | |
| 1 | 37.341 | 1.700 | 1.80610 | 40.7 |
| 2 | 14.839 | 6.839 | | |
| 3 | 76.145 | 1.500 | 1.71300 | 53.9 |
| 4 | 9.969 | 7.965 | | |
| 5 | −25.963 | 2.150 | 1.80518 | 25.5 |
| 6 | −15.329 | 0.509 | | |
| 7 | −13.756 | 0.800 | 1.61800 | 63.4 |
| 8 | −45.140 | 0.150 | | |
| 9 | 19.039 | 3.200 | 1.80518 | 25.5 |
| 10 | 102.845 | 6.930 | | |
| 11(Aperture) | ∞ | 1.800 | | |
| 12 | −750.000 | 1.780 | 1.80610 | 40.7 |
| 13 | −19.930 | 0.170 | | |
| 14 | −33.275 | 2.900 | 1.62041 | 60.3 |
| 15 | −7.039 | 1.300 | 1.84666 | 23.8 |
| 16 | −22.096 | Variable | | |
| 17 | −118.519 | 2.800 | 1.61800 | 63.4 |
| 18 | −19.730 | Variable | | |
| 19 | 97.641 | 3.100 | 1.49700 | 81.6 |
| 20 | −97.641 | BF | | |
| Image surface | ∞ | | | |

TABLE 2

(Various data)

| | Infinity distance | 1 m |
|---|---|---|
| Focal length | 7.735 | 7.733 |
| F-number | 3.607 | 3.611 |
| View angle | 89.90 | 89.90 |
| Image height | 10.824 | 10.836 |
| Overall length of lens system | 68.874 | 68.874 |
| BF | 16.965 | 16.965 |
| d0 | ∞ | 929.700 |
| d16 | 4.566 | 4.458 |
| d18 | 1.750 | 1.858 |
| Focal length of front unit | −24.64 | |
| Focal length of rear unit | 18.33 | |
| Focal length of focus lens element | 37.89 | |

Numerical Example 2

The imaging optical system of Numerical Example 2 corresponds to Embodiment 2 shown in FIG. 4. Surface data and various data of the imaging optical system according to Numerical Example 1 are shown in Table 3 and Table 4, respectively.

TABLE 3

(Surface data)

| Surface number | r | d | nd | vd |
|---|---|---|---|---|
| Object surface | ∞ | Variable | | |
| 1 | 41.323 | 2.000 | 1.80420 | 46.5 |
| 2 | 13.889 | 6.831 | | |
| 3 | 72.755 | 2.000 | 1.71300 | 53.9 |
| 4 | 8.108 | 8.015 | | |
| 5 | 19.814 | 6.300 | 1.84666 | 23.8 |
| 6 | −500.000 | 1.761 | | |
| 7(Aperture) | ∞ | 2.097 | | |
| 8 | −26.810 | 4.400 | 1.71300 | 53.9 |
| 9 | −14.932 | 0.150 | | |
| 10 | 61.554 | 4.300 | 1.61800 | 63.4 |
| 11 | −7.660 | 0.824 | 1.84666 | 23.8 |

TABLE 3-continued (Surface data)

| Surface number | r | d | nd | vd |
|---|---|---|---|---|
| 12 | −17.322 | Variable | | |
| 13 | −18.819 | 0.800 | 1.84666 | 23.8 |
| 14 | −29.367 | Variable | | |
| 15 | 192.518 | 3.000 | 1.61800 | 63.4 |
| 16 | −27.082 | BF | | |
| Image surface | ∞ | | | |

TABLE 4

(Various data)

| | Infinity distance | 1 m |
|---|---|---|
| Focal length | 7.839 | 7.835 |
| F-number | 3.601 | 3.604 |
| View angle | 89.900 | 89.900 |
| Image height | 10.822 | 10.829 |
| Overall length of lens system | 64.073 | 64.073 |
| BF | 15.072 | 15.073 |
| d0 | ∞ | 935.835 |
| d12 | 2.564 | 2.7050024 |
| d14 | 3.958 | 3.818 |

Numerical Example 3

The imaging optical system of Numerical Example 3 corresponds to Embodiment 3 shown in FIG. 7. Surface data and various data of the imaging optical system according to Numerical Example 3 are shown in Table 5 and Table 6, respectively.

TABLE 5

(Surface data)

| Surface number | r | d | nd | vd |
|---|---|---|---|---|
| Object surface | ∞ | Variable | | |
| 1 | 58.961 | 2.000 | 1.72916 | 54.7 |
| 2 | 15.372 | Variable | | |
| 3 | ∞ | 1.500 | 1.48749 | 70.4 |
| 4 | 10.211 | Variable | | |
| 5 | −19.482 | 1.000 | 1.48749 | 70.4 |
| 6 | 29.757 | 2.332 | 1.76182 | 26.6 |
| 7 | −27.431 | 0.150 | | |
| 8 | 27.364 | 1.663 | 1.84666 | 23.8 |
| 9 | −124.052 | 0.150 | | |
| 10 | 12.742 | 2.441 | 1.63980 | 34.6 |
| 11 | −15.336 | 1.041 | 1.84666 | 23.8 |
| 12 | 13.429 | 1.600 | | |
| 13(Aperture) | ∞ | 1.600 | | |
| 14 | −298.950 | 0.600 | 1.84666 | 23.8 |
| 15 | 11.806 | 3.182 | 1.61800 | 63.4 |
| 16 | −13.239 | 4.650 | | |
| 17 | 29.475 | 3.835 | 1.61800 | 63.4 |
| 18 | −33.359 | BF | | |
| Image surface | ∞ | | | |

TABLE 6

(Various data)

| | Infinity distance | 1 m |
|---|---|---|
| Focal length | 8.007 | 7.980 |
| F-number | 3.607 | 3.607 |

TABLE 6-continued (Various data)

| | Infinity distance | 1 m |
|---|---|---|
| View angle | 90.000 | 90.000 |
| Image height | 10.829 | 10.805 |
| Overall length of lens system | 61.586 | 61.586 |
| BF | 15.423 | 15.423 |
| d0 | ∞ | 936.899 |
| d2 | 10.580 | 10.462 |
| d4 | 7.841 | 7.958 |

Numerical Example 4

The imaging optical system of Numerical Example 4 corresponds to Embodiment 4 shown in FIG. 10. Surface data and various data of the imaging optical system according to Numerical Example 4 are shown in Table 7 and Table 8, respectively.

TABLE 7

(Surface data)

| Surface number | r | d | nd | vd |
|---|---|---|---|---|
| Object surface | ∞ | Variable | | |
| 1 | 48.254 | 1.700 | 1.69680 | 55.5 |
| 2 | 14.299 | 7.180 | | |
| 3 | 142.500 | 1.500 | 1.69680 | 55.5 |
| 4 | 11.257 | 6.270 | | |
| 5 | −47.621 | 2.900 | 1.80518 | 25.5 |
| 6 | −19.391 | 0.560 | | |
| 7 | −17.239 | 0.800 | 1.49700 | 81.6 |
| 8 | 750.000 | 3.060 | | |
| 9 | 14.505 | 2.200 | 1.80610 | 33.3 |
| 10 | 52.423 | 4.608 | | |
| 11(Aperture) | ∞ | 2.402 | | |
| 12 | −86.523 | 1.600 | 1.77250 | 49.6 |
| 13 | −16.697 | 0.230 | | |
| 14 | −16.036 | 3.000 | 1.58913 | 61.3 |
| 15 | −6.087 | 1.820 | 1.84666 | 23.8 |
| 16 | −14.719 | Variable | | |
| 17 | 500.000 | 2.800 | 1.61800 | 63.4 |
| 18 | −24.060 | Variable | | |
| 19 | 106.240 | 2.400 | 1.51680 | 64.2 |
| 20 | −106.240 | BF | | |
| Image surface | ∞ | | | |

TABLE 8

(Various data)

| | Infinity distance | 1 m |
|---|---|---|
| Focal length | 7.850 | 7.847 |
| F-number | 2.951 | 2.955 |
| View angle | 89.900 | 89.900 |
| Image height | 10.831 | 10.842 |
| Overall length of lens system | 67.817 | 67.817 |
| BF | 16.169 | 16.169 |
| d0 | ∞ | 930.741 |
| d16 | 4.513 | 4.405 |
| d18 | 2.105 | 2.214 |

Numerical Example 5

The imaging optical system of Numerical Example 5 corresponds to Embodiment 5 shown in FIG. 13. Surface data and various data of the imaging optical system according to Numerical Example 5 are shown in Table 9 and Table 10, respectively.

TABLE 9

(Surface data)

| Surface number | r | d | nd | vd |
|---|---|---|---|---|
| Object surface | ∞ | Variable | | |
| 1 | 49.082 | 2.000 | 1.60311 | 60.7 |
| 2 | 16.284 | 7.932 | | |
| 3 | 100.849 | 2.000 | 1.69680 | 55.5 |
| 4 | 10.253 | 9.105 | | |
| 5 | 18.230 | 3.500 | 1.71736 | 29.5 |
| 6 | −32.781 | 0.500 | | |
| 7 | −46.143 | 1.000 | 1.80610 | 40.7 |
| 8 | 8.795 | 1.000 | | |
| 9 | 12.807 | 3.400 | 1.71736 | 29.5 |
| 10 | 311.930 | 3.715 | | |
| 11(Aperture) | ∞ | 2.454 | | |
| 12 | −58.765 | 3.400 | 1.77250 | 49.6 |
| 13 | −12.403 | 0.200 | | |
| 14 | ∞ | 4.000 | 1.58913 | 61.3 |
| 15 | −8.780 | 2.300 | 1.84666 | 23.8 |
| 16 | −31.509 | Variable | | |
| 17 | ∞ | 2.952 | 1.61800 | 63.4 |
| 18 | −24.646 | BF | | |
| Image surface | ∞ | | | |

TABLE 10

(Various data)

| | Infinity distance | 1 m |
|---|---|---|
| Focal length | 7.592 | 7.582 |
| F-number | 3.606 | 3.605 |
| View angle | 89.900 | 89.900 |
| Image height | 10.816 | 10.815 |
| Overall length of lens system | 73.217 | 73.217 |
| BF | 17.513 | 17.602 |
| d0 | ∞ | 926.701 |
| d16 | 6.246 | 6.157 |

The following Table 11 shows values corresponding to the individual conditions in the imaging optical systems of the respective Numerical Examples.

TABLE 11

(Corresponding values: Numerical Examples 1 to 5)

| | Numerical Example | | | | |
|---|---|---|---|---|---|
| Condition | 1 | 2 | 3 | 4 | 5 |
| (1) R/f | 1.6 | 1.4 | 1.6 | 1.6 | 1.7 |
| (2) Σd/f | 9.1 | 8.4 | 7.9 | 8.8 | 9.9 |
| (3) Vn − Vp | 27.2 | 26.5 | 26.5 | 34.8 | 22.7 |
| (4) ff/fG | 2.1 | −3.6 | 0.3 | 1.9 | 2.4 |
| (5) f2/f | 2.4 | 2.3 | 2.1 | 2.5 | 2.2 |
| (6) βp | 0.35 | — | — | 0.38 | 0.56 |
| (7) βn | — | 1.51 | 0.34 | — | — |
| (8) D1/f | 0.07 | — | — | 0.07 | 0.07 |
| Focal length of front unit | −24.64 | −31.88 | −63.12 | −110.85 | −13.31 |
| Focal length of rear unit | 18.33 | 18.05 | 16.42 | 19.59 | 16.80 |
| ff | 37.89 | −64.11 | −20.95 | 37.22 | 39.88 |

INDUSTRIAL APPLICABILITY

An imaging optical system according to the present invention is applicable to an interchangeable-lens type camera

| | DESCRIPTION OF THE REFERENCE CHARACTERS |
|---|---|
| G1 | front unit |
| G2 | rear unit |
| L1 | first lens element |
| L2 | second lens element |
| L3 | third lens element |
| L4 | fourth lens element |
| L5 | fifth lens element |
| L6 | sixth lens element |
| L7 | seventh lens element |
| L8 | eighth lens element |
| L9 | ninth lens element |
| L10 | tenth lens element |
| A | aperture diaphragm |
| S | image surface |

The invention claimed is:

1. An imaging optical system comprising:
in order from an object side to an image side, a front unit in which a negative lens element is arranged closest to the object side, an aperture diaphragm, and a rear unit having positive optical power, wherein
in focusing from an infinite distance object to a short distance object, the negative lens element arranged closest to the object side and the aperture diaphragm are fixed with respect to an image surface, and a part of lens elements included in the front unit or the rear unit moves along an optical axis,
the following condition (1) is satisfied:

$$0.9 < R/f < 2.0 \quad (1)$$

where
R is an average between an image side curvature radius of the negative lens element arranged closest to the object side, and an image side curvature radius of a second negative lens element from the object side among all the negative lens elements, and
f is a focal length of the entire system, and
a lens element which moves along the optical axis in focusing satisfies the following condition (6) or (7):

$$0.2 < \beta p < 0.8 \quad (6)$$

$$1.0 < \beta n < 1.8 \quad (7)$$

where
βp is a paraxial imaging magnification in an infinity in-focus condition of a positive lens element which moves in focusing, and
βn is a paraxial imaging magnification in an infinity in-focus condition of a negative lens element which moves in focusing.

2. The imaging optical system according to claim 1, wherein the lens element which moves along the optical axis in focusing is a single lens element.

3. The imaging optical system according to claim 1, wherein the following condition (2) is satisfied:

$$2.0 < \Sigma d/f < 12.0 \quad (2)$$

where
Σd is an optical axial distance from a surface closest to the object side to a surface closest to the image side in the entire system, and
f is a focal length of the entire system.

4. The imaging optical system according to claim 3, wherein the following condition (8) is satisfied:

$$0.01 < D1/f < 0.20 \quad (8)$$

where
D1 is an air space between a positive lens element which is arranged closest to the object side, and a negative lens element which is arranged adjacent to the positive lens element on the image side, and
f is a focal length of the entire system.

5. The imaging optical system according to claim 1, wherein the following condition (3) is satisfied:

$$20 < Vn - Vp < 50 \quad (3)$$

where
Vn is an average of Abbe numbers to the d-line of the negative lens elements included in the front unit, and
Vp is an average of Abbe numbers to the d-line of the positive lens elements included in the front unit.

6. The imaging optical system according to claim 1, wherein the following conditions (4) and (5) are satisfied:

$$-4.0 < ff/fG < 3.0 \quad (4)$$

$$1.1 < f2/f < 4.2 \quad (5)$$

where
ff is a focal length of a lens element which moves in focusing,
fG is a composite focal length of a lens unit including the lens element which moves in focusing,
f2 is a composite focal length of the rear unit, and
f is a focal length of the entire system.

7. An interchangeable lens apparatus comprising:
an imaging optical system according to claim 1; and
a lens mount section which is connectable to a camera body including an image sensor for receiving an optical image formed by the imaging optical system and converting the optical image into an electric image signal.

8. A camera system comprising:
an interchangeable lens apparatus including an imaging optical system according to claim 1; and
a camera body which is detachably connected to the interchangeable lens apparatus via a camera mount section, and includes an image sensor for receiving an optical image formed by the imaging optical system and converting the optical image into an electric image signal.

* * * * *